United States Patent
Howard

(10) Patent No.: US 7,591,286 B2
(45) Date of Patent: Sep. 22, 2009

(54) DUCT ASSEMBLIES FOR HOUSING SERVICE CABLES, PIPES AND THE LIKE AND COMPONENTS THEREOF

(75) Inventor: Barry Howard, Linkhills (ZA)

(73) Assignee: Project Control and Engineering Services (Proprietary) Limited, Cape Town (ZA)

( * ) Notice: Subject to any disclaimer, the term of this patent is extended or adjusted under 35 U.S.C. 154(b) by 0 days.

(21) Appl. No.: 12/065,481

(22) PCT Filed: Jul. 19, 2006

(86) PCT No.: PCT/IB2006/001983

§ 371 (c)(1),
(2), (4) Date: Feb. 29, 2008

(87) PCT Pub. No.: WO2007/029060

PCT Pub. Date: Mar. 15, 2007

(65) Prior Publication Data

US 2008/0217056 A1    Sep. 11, 2008

(30) Foreign Application Priority Data

Sep. 5, 2005    (ZA) .............................. 2005/07087

(51) Int. Cl.
*F16L 9/00* (2006.01)
(52) U.S. Cl. ...................... 138/161; 138/108; 138/157; 138/114; 138/167; 138/166
(58) Field of Classification Search ................. 138/156, 138/157, 166, 162, 167, 114, 108, 106; 174/91, 174/92; 285/49
See application file for complete search history.

(56) References Cited

U.S. PATENT DOCUMENTS

| | | | | |
|---|---|---|---|---|
| 3,711,632 A * | 1/1973 | Ghirardi | ..................... | 174/135 |
| 6,595,473 B2 * | 7/2003 | Aoki et al. | ................. | 248/74.4 |
| 6,668,865 B2 * | 12/2003 | Miyamoto et al. | .......... | 138/108 |
| 6,761,189 B2 * | 7/2004 | Berninger et al. | ........... | 138/157 |
| 6,875,918 B2 * | 4/2005 | Sudo et al. | ................... | 174/363 |
| 7,119,275 B2 * | 10/2006 | Suzuki et al. | ............... | 174/503 |

FOREIGN PATENT DOCUMENTS

| | | |
|---|---|---|
| DE | 20003794 U1 | 6/2000 |
| EP | 1256756 A1 | 11/2002 |
| GB | 2260590 A | 4/1993 |
| GB | 2276694 A | 10/1994 |
| GB | 2349189 A | 10/2000 |
| WO | 9845915 A1 | 10/1998 |
| WO | 02054553 A2 | 7/2002 |
| WO | 2005045294 A2 | 5/2005 |

* cited by examiner

*Primary Examiner*—Patrick F Brinson
(74) *Attorney, Agent, or Firm*—Christensen O'Connor Johnson Kindness PLLC

(57) ABSTRACT

A channel shaped extruded duct unit cooperates with an identical duct unit to form a closed duct therewith. The duct unit has at least one integral longitudinally extending attachment formation configured to hold captive relative to the duct unit a plurality of complementary clamp elements adapted to operatively encircle a composite duct and hold the two constituent duct units in their duct defining relationship. The clamp elements have a pair of cooperating integral catch formations whereby a pair of clamp elements can be clipped together to form an operatively substantially endless clamp encircling a closed duct and an integral outwardly directed circumferential terminal flange at each axial end thereof. Generally, semicircular clip units are provided to connect the terminal flanges associated with the ends of collinear duct assemblies.

13 Claims, 5 Drawing Sheets

DUCT ASSEMBLIES FOR HOUSING SERVICE CABLES, PIPES AND THE LIKE AND COMPONENTS THEREOF

FIELD OF THE INVENTION

This invention relates to elongate duct assemblies for housing cables, pipes and the like whereby services such as electricity, communications facilities and fluids such as liquids, in particular water, and fuel gas are reticulated to various places within a predetermined building, complex, or geographic area. In particular, the invention relates to components and subassemblies thereof for use in the formation of such elongate duct assemblies.

The cables or pipes could belong to underground cable or pipe installations or above ground installations in industrial and commercial buildings. The composite duct that houses the cables or pipes can afford protection against physical damage, chemical or corrosive damage, as well as enabling such cables and pipes to be neatly arranged in a manner facilitating maintenance, repair and even replacement of the cables or pipes or sections thereof.

BACKGROUND TO THE INVENTION

The advantages of housing cables and pipes in ducts for the various purposes outlined above have long been recognized and various forms of such ducts have been proposed. Some of the advantages and prior art are more fully set out in my published international patent applications numbers PCT/ZA01/00204 and PCT/ZA2004/000019 published under international publication numbers WO 02/054553 and WO 2005/045294, and the content of which is included herein by reference.

Broadly speaking, the prior art proposals describe a duct that is formed as two opposed semicircular cross-sectioned channels the edges of which are engaged with each other to form a duct to enclose cables or pipes therein. The semicircular cross-sectioned channel shaped duct unit may have co-operant tongue and groove formations extending along the two free edges such that two identical units can have their co-operant edges inter-engaged with each other with the tongues of the formations along one edge fitting, and, in some cases, clipping, into the grooves of the formations along the other edge. The channels are held in their operative relationship with each other by means of clamps or straps that encircle the resultant duct. Alternatively, or in addition, the clipping action of the tongues into the grooves may serve to locate the two channel shaped duct units together. Such a clipping action may make it difficult to separate the two halves for maintenance or subsequent introduction of additional cables or service conduits.

The channel shaped duct unit, in some instances, is extruded, in which case the outer surface is typically smooth to cooperate with straps encircling the closed duct. These arrangements do not generally, however, provide any particular way in which the adjacent ends of two collinear units can be easily attached. They also do not provide any means on the outside of the extrusions to indicate desirable or recommended spacing of encircling straps and where those straps should be located.

In other instances, the duct units are made as injection moldings of predetermined lengths. In this instance external circumferentially extending locating grooves or recesses are provided to indicate fixed spaced positions along the length of the units at which straps or clamps for holding the two duct units together are to be located. However, with fixed length units and fixed locations for straps or clamps, fitting an integral number of units into a particular distance to be covered becomes a problem, as does the in-line connection of cut units in end to end relationship with an uncut length. In addition, if different lengths of units are to be manufactured, the capital cost of multiple injection molding dies becomes exorbitant.

OBJECT OF THE INVENTION

It is an object of this invention to provide a duct assembly; subassemblies, and components thereof that enable the drawbacks identified above to be overcome, at least to some extent.

SUMMARY OF THE INVENTION

In accordance with one aspect of this invention there is provided an extruded duct unit of channel shape in cross section and adapted to cooperate with an identical duct unit to form a closed duct therewith, the duct unit having a locating formation in the form of a rebate or groove extending along one longitudinal edge thereof and a cooperating locating formation in the form of a co-operant lip or tongue extending along the other longitudinal edge such that the two opposite edges of two duct units may cooperate operatively to form an effective joint along the two pairs of edges, the duct unit being characterized in that it has at least one integral longitudinally extending attachment formation configured to hold captive relative to the duct unit a plurality of complementary clamp elements adapted to operatively encircle a composite duct and hold the two constituent duct units in their duct defining relationship.

Further features of this aspect of the invention provide for the attachment formation to include an external headed formation such as a headed rib extending longitudinally along the duct unit on the outside thereof, preferably centrally (in the circumferential direction) with respect to the edges of the duct unit; and for each longitudinally extending edge of the duct unit to have a return lip spaced radially outwards of the outer surface of the duct unit so as to form a locating groove with such outer surface adjacent the associated edge.

In accordance with a second aspect of the invention there is provided a semicircular clamp element for use in cooperation with an extruded duct unit as defined above and wherein the clamp element has at each circumferential end thereof one of a pair of cooperating integral catch formations whereby a pair of clamp elements can be clipped together to form an operatively substantially endless clamp encircling a closed duct, the clamp element being characterized in that it has an attachment formation complementary to the attachment formation on the duct unit whereby the clamp element can be operatively attached to a duct unit to hold it captive relative thereto at a required position along the length of the duct unit.

Further features of this aspect of the invention provide for the catch formations to be formed one as a channel having a catch or a slightly inwardly lipped configuration in which case the other and cooperant catch formation has a cross-sectional shape complementary to that of the channel, preferably a generally circular cross-sectioned rod shape such that one pair of inter-engaged catches of a pair of clamp elements can form a hinge about the rod shape to enable hinging of one clamp element relative to the other between an open and a closed position; and for the clamp element to have an integral outwardly directed circumferential terminal flange at each axial end thereof.

In accordance with a third aspect of the invention there is provided a subassembly comprising a duct unit as defined above having attached thereto by means of the cooperating attachment formations, a series of longitudinally spaced clamp elements.

A further feature of the third aspect of the invention provides for a clamp element to be located at each end of the duct unit such that the outer face of the terminal flange of the clamp element is generally coincident with, or located slightly beyond, the end edge of the duct unit.

In accordance with a fourth aspect of the invention there is provided a duct assembly comprising a pair of subassemblies as defined above whereof the clamp elements each have one pair of cooperating catch formations inter-engaged so that the duct assembly comprises, effectively, a pair of hingedly interconnected duct unit subassemblies.

In accordance with a fifth aspect of the invention there is provided a generally semicircular clip unit having a pair of axially spaced grooves adapted to receive a pair of terminal flanges associated with collinear duct assemblies as defined above.

A further feature of the fifth aspect of the invention provides for the pair of axially spaced grooves to be of different depths with the bottoms of the grooves at the same radial position such that the deep groove will become more firmly attached to its associated terminal flange than the other groove.

In order that the above and other features of the invention may be more fully understood one embodiment of each of the various aspects of the invention will now be described with reference to the accompanying drawings.

DETAILED DESCRIPTION WITH REFERENCE TO THE DRAWINGS

Figure 1:
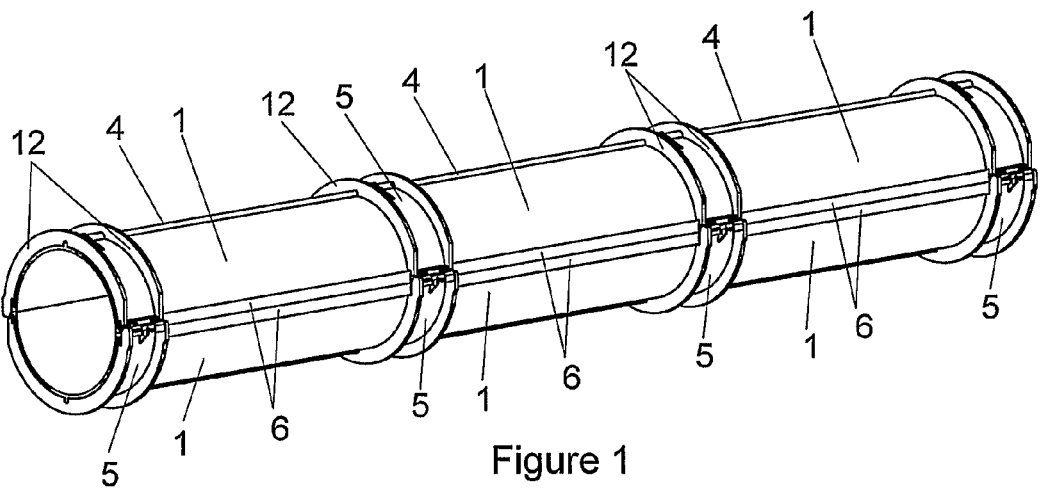
FIG. 1 is a perspective illustration of one embodiment of closed duct assembly according to the invention.

In this embodiment of the invention an extruded plastics duct unit (1) is made to a semicircular channel shape in cross-section such that a length thereof is adapted to cooperate with an identical duct unit to form a closed duct therewith, as shown in FIG. 1.

Figure 4:
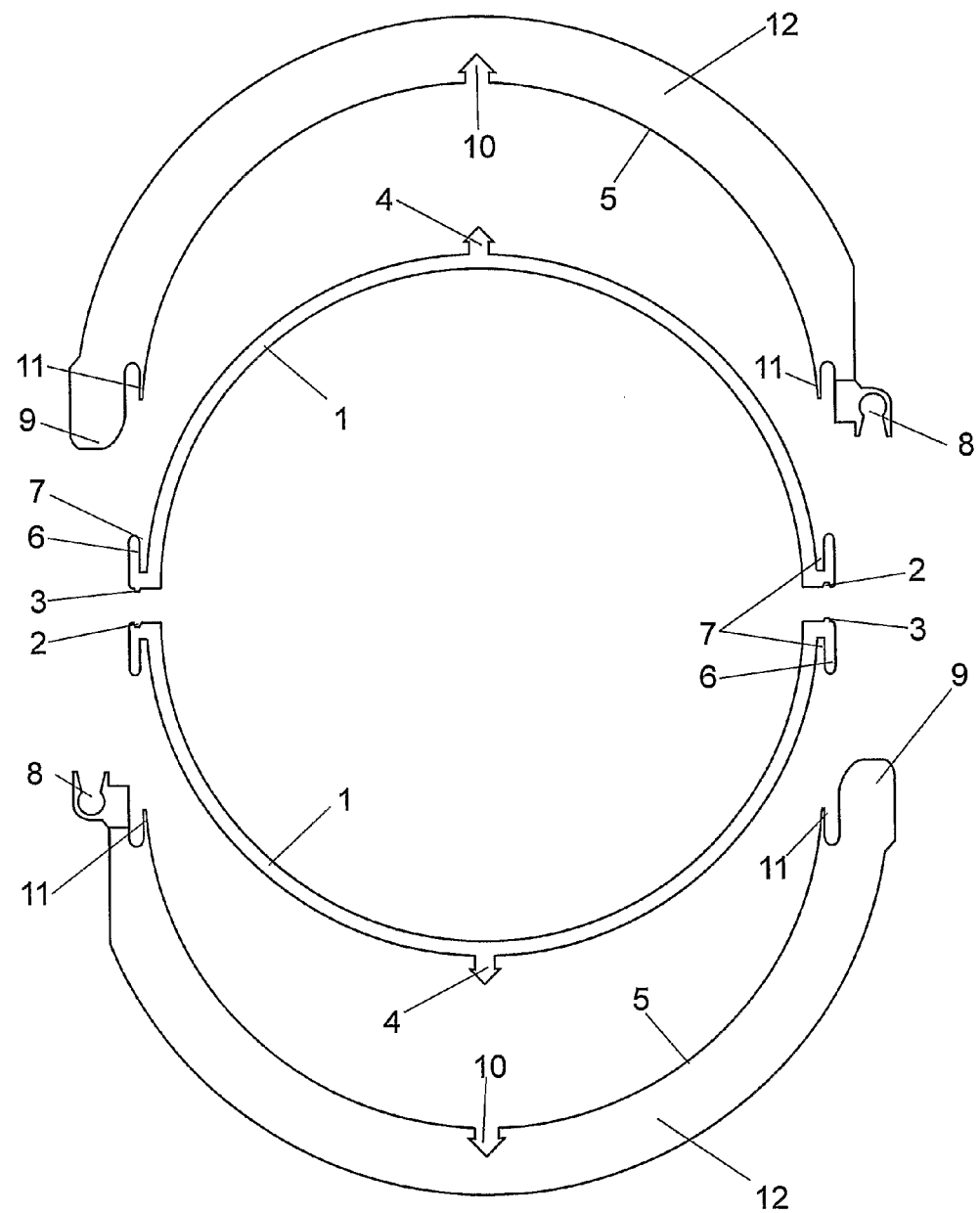
FIG. 4 is an exploded end view showing the cooperating relationship between a pair of duct units and a pair of clamp elements.
Figure 5:
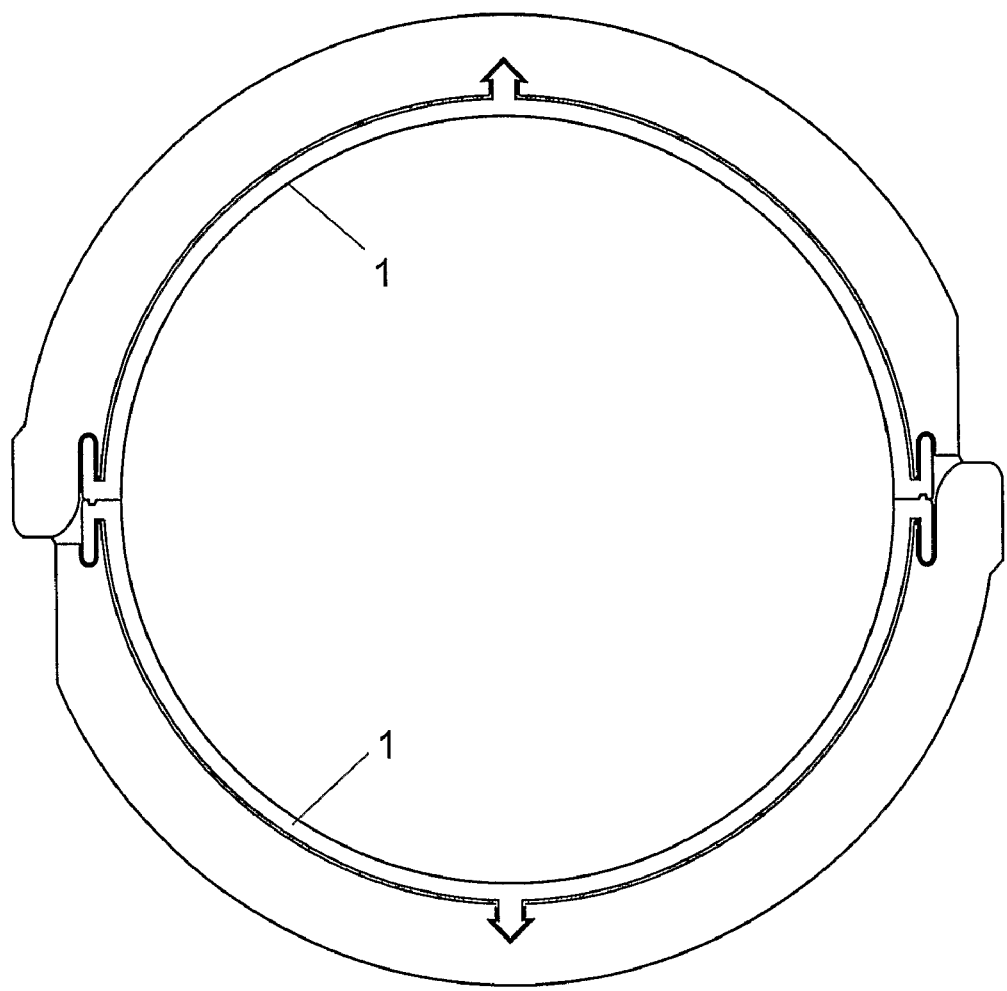
FIG. 5 is an end view of the duct units and clamp elements illustrated in FIG. 4 in the assembled condition.
Figures 7, 8:
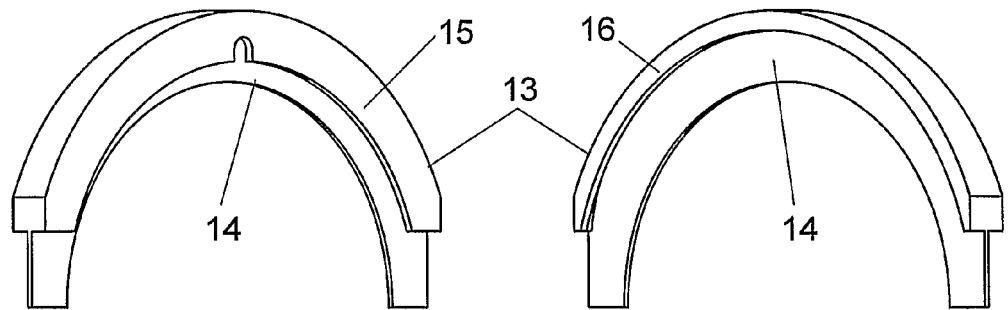
FIG. 7 is a perspective view from one side of a semicircular clip unit for connecting adjacent ends of collinear two duct assemblies in the manner illustrated in FIG. 6.
FIG. 8 is a perspective view from the other side of the clip unit.

The duct unit has, as shown most clearly in FIG. 4, a locating formation in the form of a groove (2) extending along one longitudinal edge thereof and a cooperating locating formation in the form of a co-operant squat tongue or ridge (3) extending along the other longitudinal edge. Thus the grooves and ridges extending along the two opposite edges of two duct units may cooperate operatively to effectively locate the two pairs of edges relative to each other in their duct defining relationship.

The cross-sectional shape of the extruded duct unit includes an integral longitudinally extending attachment formation in the form of a headed attachment rib (4) configured to hold captive, relative to the duct unit, a plurality of semicircular clamp elements (5) adapted to operatively hold two duct units together. The headed rib extends longitudinally along the duct unit on the outside thereof centrally (in the circumferential direction) with respect to the edges of the duct unit.

The extrusion is further shaped to provide, extending along each edge of the duct unit, a return lip (6) spaced radially outwards of the outer surface of the duct unit so as to form a locating groove (7) with such outer surface adjacent the associated edge.

Figure 3:
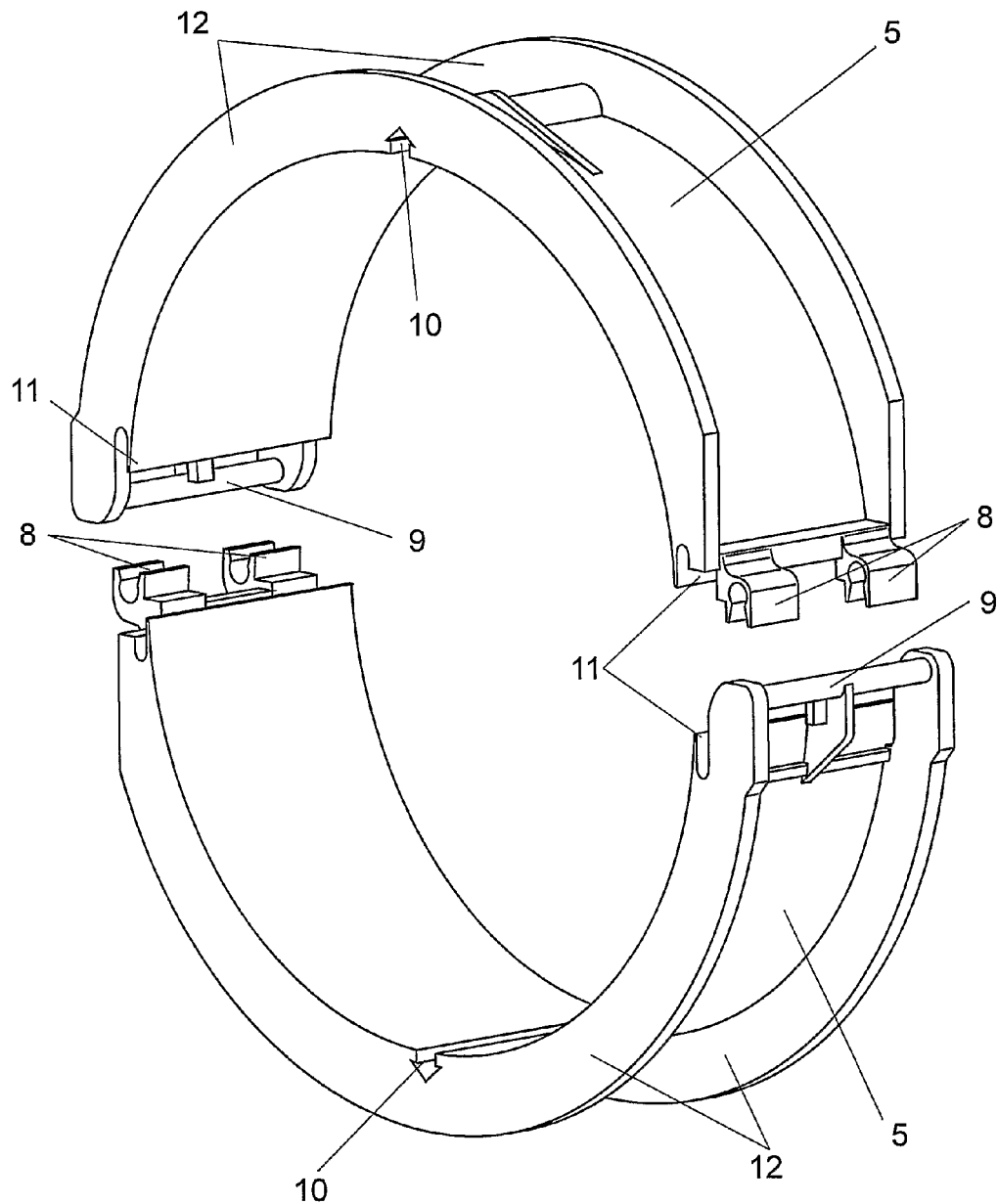
FIG. 3 is an exploded perspective illustration of a pair of cooperating clamp elements of this embodiment of the invention.

Reverting to the clamp elements (5) illustrated most clearly in FIG. 3, each clamp element is made as an injection molding to a generally semicircular ring shape of short axial length and having an inner surface configured for cooperation with the outer surface of an extruded duct unit as described above. Each clamp element has, at each circumferential end thereof, one of a pair of cooperating integral catch formations (8, 9) whereby a pair of clamp elements can be clipped together to form an effectively endless clamp encircling a closed duct.

Each clamp element has a generally key-hole shaped attachment formation in the form of an attachment groove (10) that is complementary to the attachment rib on the duct unit and whereby the clamp element can be operatively attached to a duct unit to hold it captive relative thereto at a required position along the length of the duct unit. It will be appreciated that in consequence of the finite axial length of the clamp elements and the fact that the keyhole shaped attachment formation extends over this entire axial length so as to cooperate with the attachment rib (4), the attachment rib and groove together serve to align adjacent duct units of the assembly, in use.

As regards the catch formations, one (8) is formed to a channel shape having a slightly inwardly lipped configuration and otherwise being of part circular shape in cross-section. The other and cooperant catch formation (9) has a generally circular cross-sectioned rod shape such that the former can be inter-engaged with the latter to form a pair of clamp elements that can hinge about the rod shaped formation between an open and a closed position.

The clamp elements also have, radially inwardly of the catch formations, a circumferentially extending tongue (11) that is configured to be operatively received in the cooperating locating groove (7) formed between the outer surface of the duct and the return lip (6) extending along the edge of the duct unit.

Each clamp element also has, at each axial end thereof, an integral outwardly directed circumferential terminal flange (12). The purpose of these terminal flanges is not only to reinforce the clamp elements but also to serve as a connecting flange in a manner that will become apparent from what follows.

It will thus be understood that the components described above can be used to produce a subassembly comprising a duct unit as described above having attached thereto, by means of the cooperating attachment ribs and grooves, a series of longitudinally spaced clamp elements. Typically, subassemblies of this nature would be made using a simple jig that would ensure that the clamp elements are properly spaced along the length of any predetermined duct unit. Of course, because it is made as an extrusion, a duct unit could be made to any convenient length and, indeed, subassemblies of a variety of different modular lengths could be assembled and held in readiness for sale or use.

In such a subassembly a clamp element is located at each end of the duct unit such that the outer face of the terminal flange of the clamp element is generally coincident with, or located fractionally beyond, the end edge of the duct unit. The purpose of this is to enable collinear lengths of duct to be attached to each other as will be further described below.

Figure 2:
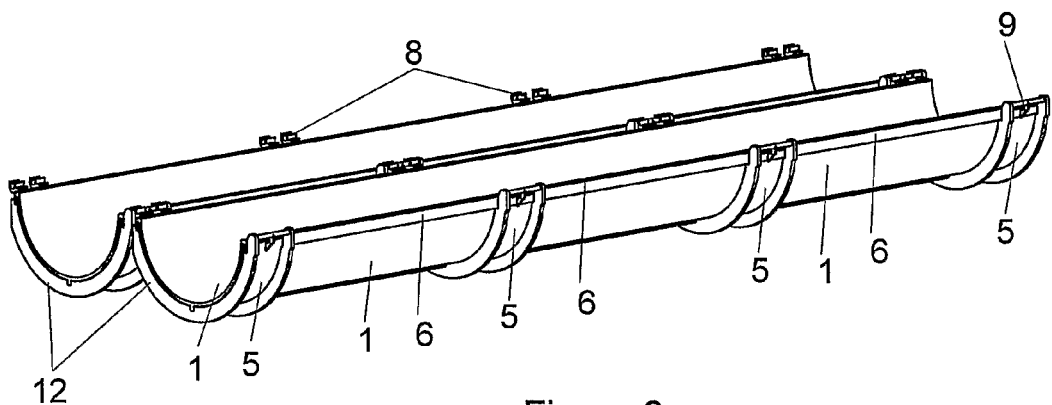
FIG. 2 is a similar illustration showing the duct assembly hinged to an open position.
Figure 6:
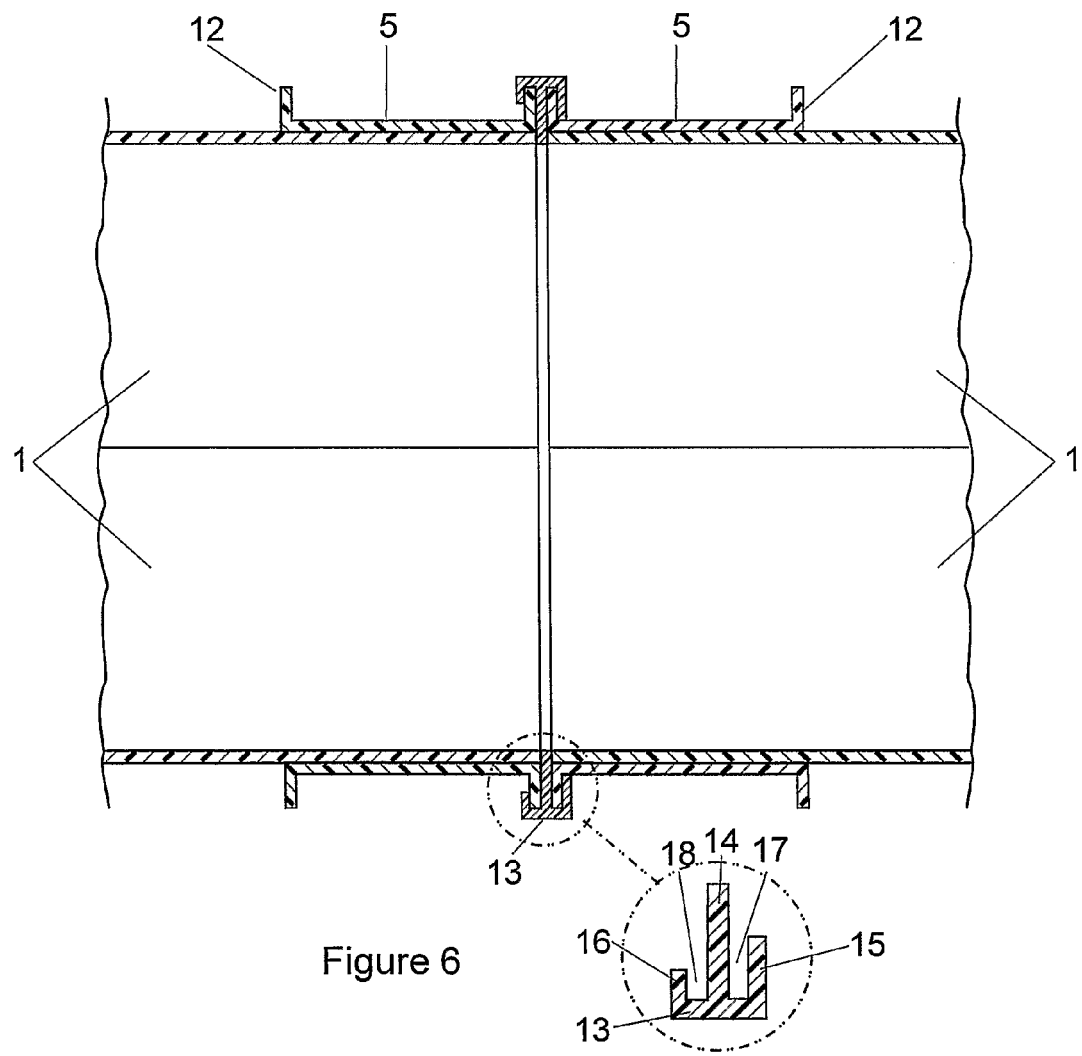
FIG. 6 that is a sectional elevation showing a joint between two collinear ends of the assemblies according to the invention.

An entire duct assembly comprising a pair of subassemblies as described above can thus be provided, as illustrated in FIG. 2, in readiness for use. In this instance, the clamp elements each have one pair of cooperating catch formations interengaged so that the duct assembly comprises, effectively, a pair of hingedly interconnected duct unit subassemblies for facilitating installation. Each subassembly also preferably comprises a clip unit (13), as is further described below, installed on the clamp element at one end of each of the duct units in the manner described with reference to, and as illustrated in, FIG. 6. A subassembly may thus be rendered ready for use without the addition of any further components.

In order to connect closed duct assemblies in end to end collinear relationship, generally semicircular plastics injection molded clip units (13) are employed. Each clip unit has a cross-section that provides a central abutment flange (14) and two locking flanges (15, 16) extending inwardly from the outer periphery of the clip unit so as to define a pair of axially spaced grooves (17, 18) adapted to receive a pair of terminal flanges associated with two collinear duct assemblies as shown clearly in FIG. 6.

The pair of locking flanges are of different radial dimensions so that the axially spaced grooves are of different depths with the bottoms of the grooves at the same radial position. This arrangement, together with the fact that the deeper of the grooves may be somewhat narrower at the mouth, ensures that a terminal flange fully located in the deeper groove will become more firmly attached to its associated terminal flange than the other groove will relative to its associated terminal flange. This arrangement also enables the clip units to be preassembled onto a subassembly or duct assembly, at one end thereof, prior to installation of the duct assembly.

In use, an elongate duct assembly can easily be made up from a series of coaxial duct units generally in the form of subassemblies of the type described above. A collinear series of duct units can be laid along a required path and any desired cables, pipes or other elongate service elements installed therein. The co-operant duct units are then closed and the clamp elements clipped together in cooperating relationship to close the duct.

At the same time, the necessary end-on-end joins are made by engaging the terminal flange of the one subassembly with the clip unit of the other subassembly and the clip unit automatically joins the adjacent clamp elements when the duct assembly is closed.

Figure 9:
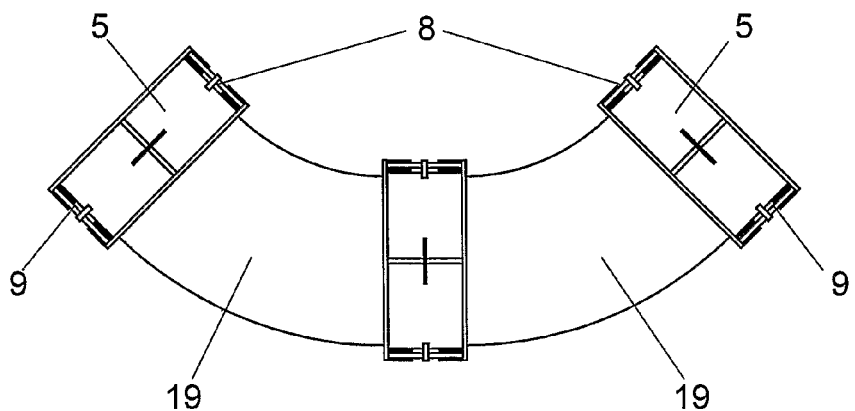
FIG. 9 is a plan view of a fabricated elbow assembly indicating the manner in which fittings for the duct assembly can be produced.

It is to be noted that, as indicated in FIG. 9, junctions and bends can be formed using standard commercially available junctions and bends indicated illustratively by numeral (19); splitting them, as may be required, in a plane including the axes of the various inlets and outlets to form two mirror image shells and attaching to the inlet and outlets, with the optional use of appropriately split connecting sleeves, clamp elements as described above. The junction or bend, as the case may be, is then connected to a duct assembly as described above using the clip units already described.

It is to be noted that it is not the intention that a duct assembly as described above be water or gas impermeable and, accordingly, it is not necessary to seal the various surfaces to each other, where they adjoin. It is sufficient that the ingress of dirt and grit is substantially inhibited.

It will be understood that numerous variations may be made to the embodiment of the invention described above without departing from the scope hereof. In particular, the shape and configuration of the longitudinally extending attachment formations may be varied widely and, indeed, the grooves and tongues associated with the return lips at the edges of the units and the ends of the clamp elements may be configured for this purpose.

The invention therefore provides a simple and effective duct assembly, subassemblies and components that possess the advantages of the extrusion process for the production of the duct units themselves but also possess the advantages of injection molded duct units.

The invention claimed is:

1. An extruded elongate duct unit having a channel shape of constant cross section along the length thereof and two longitudinally extending edges, the duct unit being adapted to cooperate with an identical duct unit to form a closed duct therewith, wherein a locating formation in the form of a rebate or groove extends along one longitudinal edge of the duct unit and a cooperating locating formation selected from a co-operant lip, ridge and tongue extends along the other longitudinal edge such that the two longitudinally extending edges of two duct units may cooperate operatively to form an effective joint along the edges, wherein the duct unit has at least one integral longitudinally extending attachment formation configured to hold captive relative to the duct unit a plurality of complementary clamp elements adapted to operatively encircle a composite duct and hold the two constituent duct units in their duct defining relationship.

2. An extruded elongate duct unit as claimed in claim 1 in which the attachment formation includes an external headed formation extending longitudinally along the duct unit on the outside thereof.

3. An extruded elongate duct unit as claimed in claim 2 in which the external headed formation is located centrally, in the circumferential direction, with respect to the edges of the duct unit.

4. An extruded elongate duct unit as claimed in claim 1 in which each longitudinally extending edge of the duct unit has a return lip spaced radially outwards of the outer surface of the duct unit so as to form a locating groove with such outer surface adjacent the associated edge.

5. A semicircular clamp element for use in cooperation with an extruded elongate duct unit as claimed in claim 2 wherein the clamp element has at each circumferential end thereof one of a pair of cooperating integral catch formations whereby a pair of clamp elements can be clipped together to form an operatively substantially endless clamp encircling a closed duct, wherein the clamp element has an attachment formation complementary to the attachment formation on the duct unit whereby the clamp element can be operatively attached to a duct unit to hold it captive relative thereto at a required position along the length of the duct unit.

6. A semicircular clamp element as claimed in claim 5 in which the catch formations are formed one as a channel having a catch configuration in which case the other and cooperant catch formation has a cross-sectional shape complementary to that of the channel.

7. A semicircular clamp element as claimed in claim 6 in which the cooperant catch formation is of a generally circular cross-sectioned rod shape such that one pair of inter-engaged catches of a pair of clamp elements can form a hinge about the rod shape to enable hinging of one clamp element relative to the other between an open and a closed position.

8. A semicircular clamp element as claimed in claim 5 in which the clamp element has an integral outwardly directed circumferential terminal flange at each axial end thereof.

9. A subassembly comprising a duct unit as defined in claim 1 having attached thereto a series of longitudinally spaced semicircular clamp elements, each of which has at each circumferential end thereof one of a pair of cooperating integral catch formations, whereby a pair of clamp elements can be clipped together to form an operatively substantially endless clamp encircling a closed duct, wherein each clamp element has an attachment formation complementary to, and engaged with, the attachment formation on the duct unit, whereby the clamp element is held captive relative to the duct unit at a required position along the length thereof.

10. A subassembly as claimed in claim 9 in which a clamp element is located at each end of the duct unit such that the outer face of the terminal flange of the clamp element is generally coincident with, or located slightly beyond, the end edge of the duct unit.

11. A duct assembly comprising a pair of subassemblies as claimed in claim 9 wherein the clamp elements each have one pair of cooperating catch formations inter-engaged so that the duct assembly comprises, effectively, a pair of hingedly interconnected duct unit subassemblies.

12. A generally semicircular clip unit having a pair of axially spaced grooves adapted to receive a pair of terminal flanges associated with collinear duct assemblies as claimed in claim 11.

13. A generally semicircular clip unit as claimed in claim 12 in which the pair of axially spaced grooves are of different depths with the bottoms of the grooves at the same radial position such that a deeper groove will become more firmly attached to its associated terminal flange than the other groove.

* * * * *